United States Patent
Bouvet et al.

(10) Patent No.: US 9,106,667 B2
(45) Date of Patent: Aug. 11, 2015

(54) METHOD OF PROCESSING SIP MESSAGES

(75) Inventors: Bertrand Bouvet, Perros Guirec (FR);
Jean-Michel Bonnamy, Pleumeur Bodou (FR)

(73) Assignee: ORANGE, Paris (FR)

( * ) Notice: Subject to any disclaimer, the term of this patent is extended or adjusted under 35 U.S.C. 154(b) by 119 days.

(21) Appl. No.: 13/819,977

(22) PCT Filed: Aug. 26, 2011

(86) PCT No.: PCT/FR2011/051970
§ 371 (c)(1),
(2), (4) Date: Feb. 28, 2013

(87) PCT Pub. No.: WO2012/028807
PCT Pub. Date: Mar. 8, 2012

(65) Prior Publication Data
US 2013/0163590 A1    Jun. 27, 2013

(30) Foreign Application Priority Data
Sep. 1, 2010  (FR) .................. 10 56921

(51) Int. Cl.
H04L 12/28    (2006.01)
H04L 29/06    (2006.01)
H04L 12/24    (2006.01)

(52) U.S. Cl.
CPC .......... *H04L 65/102* (2013.01); *H04L 41/0896* (2013.01); *H04L 65/607* (2013.01); *H04L 65/80* (2013.01)

(58) Field of Classification Search
USPC ................... 370/352, 392, 401, 410
See application file for complete search history.

(56) References Cited

U.S. PATENT DOCUMENTS

| | | | | |
|---|---|---|---|---|
| 2002/0151312 | A1* | 10/2002 | Bos et al. ............... | 455/452 |
| 2003/0007497 | A1* | 1/2003 | March et al. ........... | 370/410 |
| 2007/0060124 | A1* | 3/2007 | Kalavade ............... | 455/433 |
| 2007/0121608 | A1* | 5/2007 | Gu et al. ................ | 370/356 |

(Continued)

FOREIGN PATENT DOCUMENTS

| | | |
|---|---|---|
| EP | 1 806 900 A1 | 7/2007 |
| EP | 1 944 922 A1 | 7/2008 |

(Continued)

OTHER PUBLICATIONS

International Search Report mailed Oct. 28, 2011 for PCT/FR2011/051970 filed Aug. 26, 2011.

*Primary Examiner* — Andrew Lee
(74) *Attorney, Agent, or Firm* — Knobbe Martens Olson & Bear LLP (57) ABSTRACT

An SIP message processing method is disclosed. It may be performed by a node of a telecommunications network having a home gateway connected to an IMS network core via an access connection, at least a first SIP terminal and a second SIP terminal locally connected to said home gateway. It may include obtaining a bandwidth of the access connection, receiving a first SIP message concerning the first SIP session, determining the bandwidth in use by the first SIP session as a function of the first SIP message, receiving a second SIP message concerning the second SIP session, determining a bandwidth authorized for the second SIP session as a function of the second SIP message, of the bandwidth of the access connection, and of the bandwidth in use by the first SIP session, and sending a third SIP message to the first terminal, the second terminal, or the IMS network core.

17 Claims, 8 Drawing Sheets

(56) References Cited

U.S. PATENT DOCUMENTS

| | | | |
|---|---|---|---|
| 2008/0176597 A1* | 7/2008 | Bantukul | 455/552.1 |
| 2008/0293427 A1* | 11/2008 | Quon et al. | 455/452.1 |
| 2009/0049180 A1* | 2/2009 | Ei et al. | 709/227 |
| 2010/0278125 A1* | 11/2010 | Clair et al. | 370/329 |
| 2011/0009122 A1* | 1/2011 | Kalavade | 455/445 |
| 2012/0047273 A1* | 2/2012 | Ajero et al. | 709/228 |
| 2012/0303825 A1* | 11/2012 | Xie | 709/228 |
| 2013/0242858 A1* | 9/2013 | Amine | 370/328 |

FOREIGN PATENT DOCUMENTS

| | | |
|---|---|---|
| FR | 2 909 820 A1 | 6/2008 |
| WO | WO 2008/071891 A1 | 6/2008 |

\* cited by examiner

METHOD OF PROCESSING SIP MESSAGES

RELATED APPLICATIONS

This application is the U.S. National Phase of Application No. PCT/FR2011/051970 entitled "METHOD OF PROCESSING SIP MESSAGES" filed Aug. 26, 2011, which designated the United States, and which claims the benefit of French Application No. 1056921 filed Sep. 1, 2010.

BACKGROUND OF THE INVENTION

The invention relates to the general field of telecommunications. More particularly, the invention relates to managing quality of service during a call between a terminal connected to a home gateway and a remote terminal by using the session initiation protocol (SIP).

In known manner, a home gateway connected to a remote network enables a local terminal to set up a call with a remote terminal by using a voice over Internet protocol (VoIP). Typically, the local terminal uses the SIP protocol (as standardized in document RFC 3161) in order to set up the call, and in particular in order to negotiate with the remote terminal to determine which codec(s) are to be used.

By way of example, the local terminal comprises an SIP agent (known as a "user agent" (UA)) that is internal to the gateway, and that has an analog or a digital telephone connected thereto. In this context, the home gateway is capable of detecting the bandwidth of its access to the Internet and of suggesting to the SIP agent that it uses codecs that are compatible with the detected bandwidth.

Furthermore, users generally desire to make use of a plurality of local terminals connected to the gateway in order to make calls simultaneously. For example, a first terminal comprises an SIP agent that is internal to the gateway and connected to a digital or an analog telephone, whereas additional terminals are terminals that are external to the gateway, and as constituted by a multifunction mobile telephone or by a personal computer executing VOIP telephony software ("Softphone"), or indeed hardware terminals of the tablet, new generation TV, . . . , type. These external terminals may be connected to the gateway via a wireless connection, e.g. of the WiFi type, or via a wired connection, e.g. of the Ethernet type. Document FR 2 909 820 thus describes configuring a home gateway connected to four local terminals.

In such a situation, it is known to share the bandwidth of the access connection by allocating a virtual channel to each type of traffic. Thus, a conversational virtual channel is dedicated to the SIP agent internal to the gateway and an Internet virtual channel is dedicated to traffic coming from the external terminal. The conversational virtual channel is considered as having priority, and it is therefore dimensioned for a telephone conversation or for a video phone call, whereas the Internet virtual channel operates in the so-called "best effort" mode. Thus, if the conversational virtual channel is in use by the internal SIP agent for a conversation, then the bandwidth available for a telephone call coming from an external terminal may not be sufficient, given the selected codec, and conversation quality may be degraded.

It is also known to use a single virtual channel and to prioritize the various types of traffic by making use of IP packet marking and a plurality of packet processing queues, making prioritization available. Under such circumstances, if a priority queue is dedicated to the internal SIP agent and a best effort queue is dedicated to Internet traffic coming from the external terminals, the same problem arises as that described above, namely possible degradation of the quality of the conversation with the external terminal. If the same queue is used for the voice conversations coming from the internal SIP agent and from the external terminals, then the quality of all of the conversations can be degraded during simultaneous conversations.

There is thus a need for better management of the quality of service when a plurality of terminals make use of the same home gateway for simultaneous calls.

OBJECT AND SUMMARY OF THE INVENTION

The invention seeks to provide an SIP message processing method that does not present at least some of the above-mentioned drawback. In particular, the invention seeks to enable multiple communications to take place simultaneously without quality degradation.

To this end, the invention provides an SIP message processing method performed by a node of a telecommunications network, the network having a home gateway connected to an internet protocol (IP) multimedia system (IMS) network core via an access connection, at least a first SIP terminal and a second SIP terminal locally connected to the home gateway, the first SIP terminal being suitable for setting up a first SIP session to the IMS network core by passing via the access connection, the second SIP terminal being suitable for setting up a second SIP session to the IMS network core by passing via the access connection, the processing method including a step of obtaining a bandwidth of the access connection, and being characterized in that it comprises:

a step of receiving a first SIP message concerning the first SIP session;
  a step of determining the bandwidth in use by the first SIP session as a function of the first SIP message;
  a step of receiving a second SIP message concerning the second SIP session;
  a step of determining a bandwidth authorized for the second SIP session as a function of the second SIP message, of the bandwidth of the access connection, and of the bandwidth in use by the first SIP session; and
  a step of sending a third SIP message to the first terminal, the second terminal, or the IMS network core, the third message being determined as a function at least of the bandwidth authorized for the second SIP session, the third SIP message being for influencing a selection of bandwidth for the first SIP session or for the second SIP session.

By means of the invention, in response to receiving the third message, the bandwidth of the first SIP session or of the second SIP session can be adapted by the first terminal, the second terminal, or the IMS network core so as to take account of the bandwidth authorized for the second SIP session. Thus, the bandwidth used by the second SIP session is compatible with the bandwidth of the access connection, given the bandwidth in use by the first SIP session. In this way, the invention makes it possible to avoid degradation of the quality of service for both SIP sessions.

In a first arrangement of the invention, the processing method is performed in series in the SIP signaling streams.

Thus, in a variant, the second SIP message is an INVITE SIP message sent by the second SIP terminal and containing a session description protocol (SDP) field specifying the codecs desired by the second SIP terminal, the step of determining a bandwidth authorized for the second SIP session comprising selecting at least one authorized codec from the desired codecs, and the third SIP message being an INVITE SIP message sent to the IMS network core and containing an SDP field specifying the at least one authorized codec.

This makes it possible to filter the codecs desired by the second SIP terminal so as to retain only those that are compatible with the available bandwidth.

In this variant, the first SIP message may be an OK SIP message containing an SDP field specifying the codec(s) in use for the first SIP session, the bandwidth in use by the first SIP session being determined as a function of the codec(s) in use.

This makes it possible to determine accurately the bandwidth that is actually in use by the first SIP session.

In an implementation, in response to determining that the bandwidth in use by the first SIP session is less than the bandwidth previously used by the first SIP session, the third SIP message is a Re-INVITE SIP message sent to the second SIP terminal and not containing an SDP field.

This enables the second SIP terminal to renegotiate the codec(s) for use in the second SIP session, and possibly to use a codec that gives a better quality call because additional bandwidth is available.

For example, the first SIP message may be a BYE SIP message received from the first SIP terminal.

This means that the first SIP session has terminated and is no longer using bandwidth. The quality of the second SIP session can then be greatly improved.

In an implementation, when the second SIP message contains information specifying that the second SIP session has higher priority than the first SIP session, the third SIP message is a Re-INVITE SIP message sent to the first SIP terminal and not containing an SDP field.

This makes it possible to force the first SIP terminal to renegotiate the codec(s) in use for the first SIP session in order to reduce the bandwidth in use by the first SIP session and thus release bandwidth for the second SIP session.

In another arrangement of the invention, the method is performed by a module with which the SIP terminals can "subscribe" in the meaning of the SIP. This module is suitable for communicating with the SIP terminals in order to inform them about the codecs they can use, given the available bandwidth. The advantages mentioned above with reference to the first arrangement are to be found in corresponding manner in the second arrangement.

Thus, in an implementation, the second SIP message is a Subscribe SIP message sent by the second SIP terminal and containing an SDP field specifying the codecs desired by the second SIP terminal, the step of determining a bandwidth authorized for the second SIP session including the selection of at least one authorized codec from among the desired codecs, and the third SIP message being a Notify SIP message sent to the second SIP terminal and containing an SDP field specifying said at least one authorized codec.

The first SIP message may be a Subscribe SIP message containing an SDP field specifying the codec(s) in use for the first SIP session, the bandwidth in use by the first SIP session being determined as a function of the codec(s) in use.

In a variant, in response to determining that the bandwidth in use by the first SIP session is less than the bandwidth previously used by the first SIP session, the third SIP message is a Notify SIP message sent to the second SIP terminal and containing a field specifying the codecs authorized for the second SIP session.

The first SIP message may be a Subscribe SIP message containing a field indicating that at least one codec previously used by the first SIP session is no longer in use.

In a variant, when the second SIP message contains information specifying that the second SIP session has higher priority than the first SIP session, the third SIP message is a Notify SIP message sent to the first SIP terminal and containing a field specifying at least one codec that is no longer authorized for the first SIP session.

In an implementation, the processing method includes a step of sending a Notify SIP message to the first or second SIP terminal, the Notify SIP message containing at least one authorized codec, the first or second SIP terminal being suitable for adapting a man/machine interface as a function of said at least one authorized codec.

Correspondingly, the invention also provides an SIP message processor device for a telecommunications network including a home gateway connected to an IMS network core by an access connection, at least a first SIP terminal and a second SIP terminal locally connected to the home gateway, the first SIP terminal being suitable for setting up an SIP session to the IMS network core by passing via the access connection, the second SIP terminal being suitable for setting up a second SIP session to the IMS network core by passing via the access connection, the processor device including means for obtaining a bandwidth of the access connection, and the processor device being characterized in that it comprises:

means for receiving a first SIP message concerning the first SIP session;
means for determining the bandwidth in use by the first SIP session as a function of the first SIP message;
means for receiving a second SIP message concerning the second SIP session;
means for determining a bandwidth authorized for the second SIP session as a function of the bandwidth of the access connection and of the bandwidth in use by the first SIP session; and
means for sending a third SIP message to the first terminal, the second terminal, or the IMS network core, the third message being determined as a function at least of the bandwidth authorized for the second SIP session, the third SIP message being for influencing a selection of bandwidth for the first SIP message or for the second SIP session.

The processor device may for example be the home gateway or an application server connected to the IMS network core. If it is a home gateway, the first SIP terminal and/or the second SIP terminal may be internal to the gateway and the first SIP message, the second SIP message, and the third SIP message may be messages internal to the gateway.

The invention also provides a computer program including instructions for executing steps of the above-specified processing method when the program is executed by a computer.

The program may use any programming language and may be in the form of source code, object code, or code intermediate between source code and object code, such as in a partially complied form, or in any other desirable form.

The invention also provides a computer readable recording medium or information medium that includes computer program instructions as mentioned above.

The above-mentioned recording media may be any entity or device capable of storing the program. For example, the medium may comprise storage means such as a read-only memory (ROM), a compact disk (CD) ROM, or a microelectronic circuit ROM, or indeed magnetic recording means, e.g. a floppy disk or a hard disk.

Furthermore, the recording media may correspond to a transmissible medium such as an electrical or optical signal, that may be conveyed via an electrical or optical cable, by radio, or by other means. The program of the invention may in particular be downloaded from an Internet type network.

Alternatively, the recording media may correspond to an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings that show an implementation having no limiting character. In the figures.

DETAILED DESCRIPTION OF IMPLEMENTATIONS

Figure 1:
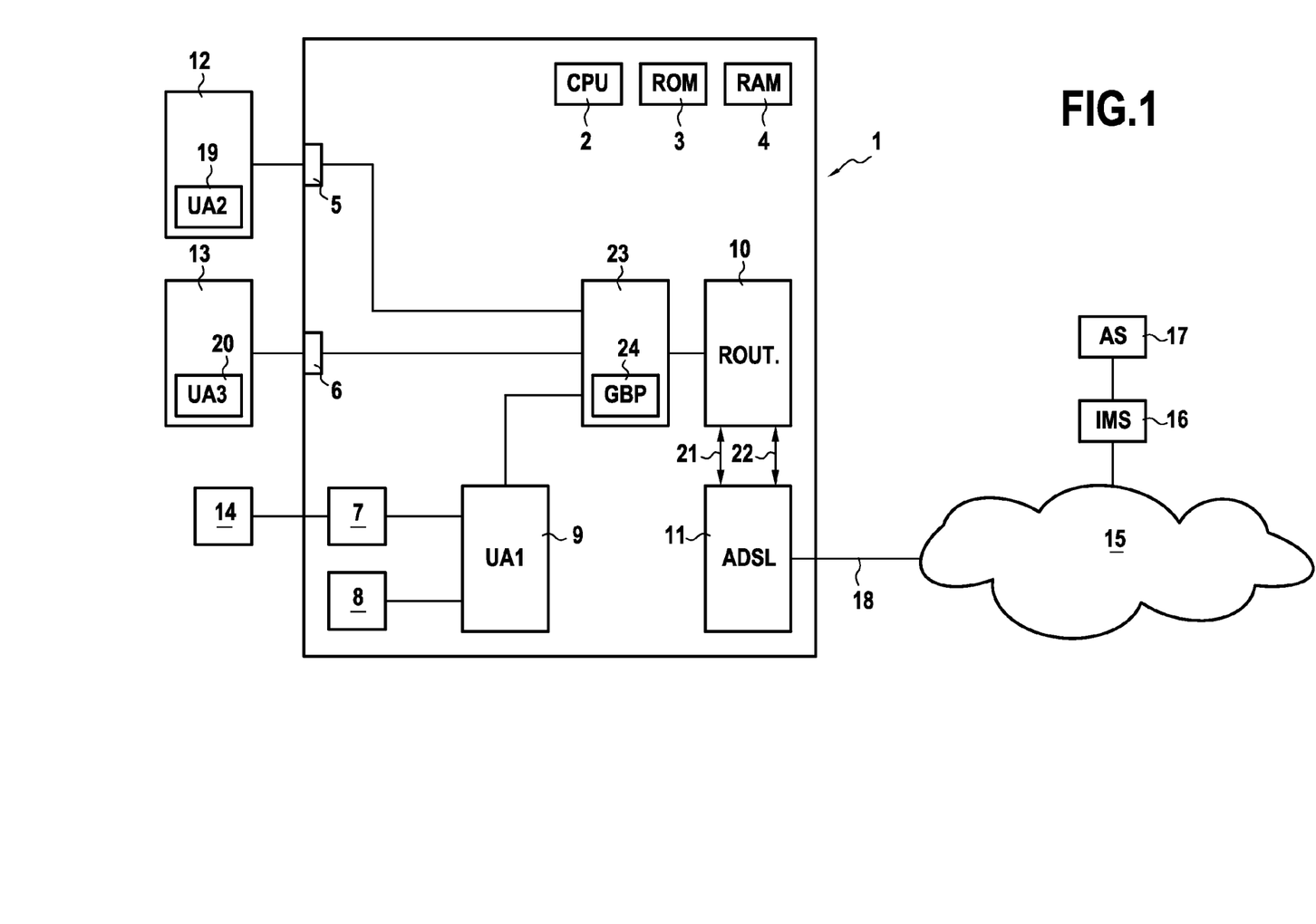
FIG. 1 is a diagram showing a home gateway in its environment and performing an SIP message processing method in one arrangement of the invention.

FIG. 1 shows a home gateway 1 in its environment. The gateway 1 presents the hardware architecture of a computer and in particular it comprises a processor 2, a ROM 3, and a random access memory (RAM) 4. The ROM 3 stores a computer program having instructions for executing the SIP message processing method in accordance with the invention, as described below, and it constitutes an information medium in accordance with the invention.

The gateway 1 also has local interfaces 5, 6, 7, and 8, an internal SIP agent 9 (user agent UA1), an SIP gateway 23 incorporating a bandwidth management module 24 (GBP), a router module 10, and an asymmetric digital subscriber line (ADSL) interface 11.

In the example described herein, the gateway 1 is connected to three local communications devices, namely two terminals 12 and 13 that handle the SIP protocol, and a telephone 14 that does not handle the SIP protocol.

By way of example, the terminal 12 is a multifunction telephone connected to the interface 5 of the gateway 1 by a wireless connection, e.g. a WiFi connection. The terminal 12 executes voice over IP software and thus includes an SIP agent 19 (user agent UA2). By way of example, the terminal 13 is for example a personal computer connected to the interface 6 of the gateway 1 by a wired connection, e.g. an Ethernet connection. The terminal 13 executes voice over IP software and thus includes an SIP agent 20 (user agent UA3). By way of example, the telephone 14 is a digital telephone connected by a universal serial bus (USB) cable to the interface 7, or in a variant an analog telephone connected by a cable to the interface 8 that constitutes a foreign exchange subscriber (FXS) port. Either way, the telephone 14 is connected to the SIP agent 9 (UA1).

The SIP agent 9 is connected to the SIP gateway 23. The SIP agents 19 and 20 may also communicate with the SIP gateway 23 via the interfaces 5 and 6. The SIP gateway 23 is connected to the router module 10. Finally, the router module 10 is connected to the ADSL interface 11 that enables the gateway 1 to communicate with nodes of a network 15 via an access connection 18.

The network 15 comprises in particular an access network and a subnetwork based on an IP multimedia subsystem (IMS) architecture, as specified in the 3GPP and TISPAN standards. In known manner, such an architecture relies on an IMS network core 16 (also referred to as an IMS core network), that comprises a plurality of functional entities such as, for example: a call session control function (CSCF) entity, a breakout gateway control function (BGCF) entity, and application servers 17.

The SIP traffic coming from the SIP agents 9, 19, and 20 is processed by the SIP gateway 23 in a manner that is described below, and is then relayed to the router module 10. Thereafter, it is routed by the router module 10, via the ADSL interface 11 and the access connection 18, to the IMS network core 16.

The SIP traffic coming from the internal SIP agent 9 is considered as having priority over the SIP traffic coming from the external terminals 12 and 13. Thus, in a first variant, the SIP traffic coming from the SIP agent 9 is routed to the ADSL interface 11 in a conversational virtual channel 21 to which a predetermined bandwidth is allocated, and the SIP traffic coming from the SIP agents 19 and 20 is routed to the ADSL interface in an Internet virtual channel 22 operating in best effort mode. In another variant, the SIP traffic streams are prioritized by marking the IP packets and by directing the IP packets to a conversational queue or to a best effort queue. In both variants, it can be considered that the SIP traffic is directed to a first interface or to a second interface, which interfaces have different priorities.

As mentioned above, the SIP gateway 23 processes the SIP traffic. More precisely, the role of the bandwidth management module 24 is in particular:

- to detect the total bandwidth at the access (BPGA) of the access connection 18;
- to detect the bandwidth for each specialized interface (BPIS), i.e. the bandwidths associated respectively with the conversational virtual channel and with the Internet virtual channel in the context of the above-described architecture with a plurality of virtual channels, or else the bandwidths allocated respectively to the various traffic queues in the context of an above-described single virtual channel architecture; and
- to act in real time to estimate the bandwidth available on the access as a whole and/or per specialized interface, e.g. on the basis of SIP signaling messages and/or on the basis of analyzing recurrent traffic transmitted/received in the lower layers.

The role of the SIP gateway 23 is in particular:
- to perform the back-to-back user agent (B2BUA) SIP role with respect to the SIP agents 9, 19, and 20;
- to detect the INVITE, UPDATE, Re-INVITE, and ACK SIP signaling messages and the SIP responses for:
    - extracting the session description protocol (SDP) fields;
    - determining the bandwidths corresponding to the detected SDP fields; and
    - determining the list of codecs that can be used, given the available bandwidth as estimated by the bandwidth management module 24, and thus filter certain codecs out of the SDP fields before relaying the signaling messages; and
- to send the Re-INVITE SIP message without an SDP field in order to force the SIP agents 9, 19, and 20 to renegotiate the session whenever specific events occur, so as to optimize the quality of the session or so as to force a stream to be eliminated when the bandwidth in use by one SIP session is needed by another SIP session.

By way of example, the SIP gateway 23 is implemented in the form of an application layer gateway (ALG) SIP presenting bandwidth management functions, either because it has the bandwidth management module 24 as shown in FIG. 1, or else because it is capable of communicating with an external bandwidth management module, in a variant that is not shown.

Figure 2:
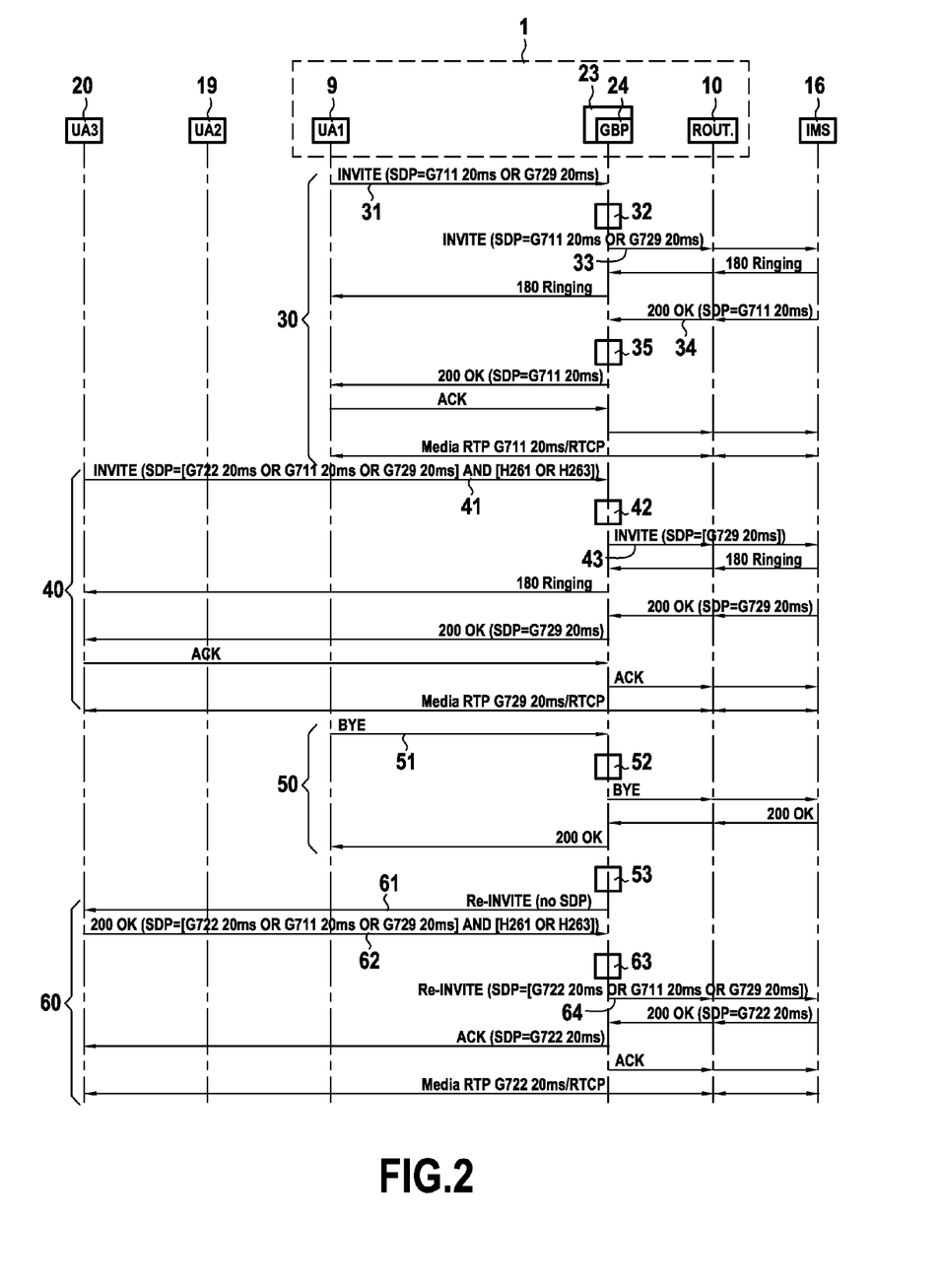
FIGS. 2 and 3 show messages exchanged while executing the SIP message processing method performed by the FIG. 1 gateway.

With reference to FIG. 2, there follows a description of a first example of the conduct of SIP message processing as performed by the gateway 1.

When the gateway 1 starts (and on each synchronization for an xDSL access), the bandwidth management module 24 detects the total bandwidth at the access (BPGA) of the access connection 18 and the bandwidths of each of the specialized interfaces. For example, the total access bandwidth may be 200 kilobits per second (kbit/s) and the bandwidth of the conversational virtual channel may be 160 kbit/s.

In FIG. 2, during a stage 30, the SIP agent 9 seeks to set up a call. It therefore sends an INVITE SIP message 31 containing in particular the called number, the calling number, and an SDP field specifying the proposed codecs. In the example described, the desired call is a voice call and the proposed codecs are G711 20 ms or G729 20 ms. Thereafter, during the step 32, the SIP gateway 23 compares the available bandwidth on the conversational virtual channel with the bandwidth needed for the proposed codecs. For this purpose, the SIP gateway 23 interrogates the bandwidth management module 24 that, by way of example, contains a table specifying the bandwidth needed for each type of codec, framing, IP version (V4/V6), type of protocol for attachment to the network (DHCP, PPPoE, PPPoA, ...) with reference to the type of access connection, etc. In the present example, the SIP gateway 23 determines that both codecs are compatible with the available bandwidth. Thus, the SIP gateway 23 relays the INVITE SIP message 31 by sending an INVITE SIP message 33 to the IMS network core 16, without modifying the SDP field.

In the example described, the response received from the IMS network core 16 is a 200 OK SIP message 34 in which the SDP field contains the negotiated G711 20 ms codec. The message 34 is received by the SIP gateway 23, which constitutes a step of receiving a first SIP message concerning a first SIP session in the meaning of the invention. As a result of receiving the SIP message 34, the bandwidth management module 24 acts in a step 35 to determine that the SIP agent 9 is going to use a bandwidth of 106 kbit/s which corresponds to the negotiated codec taken from the 200 kbit/s available in this example. The step 35 constitutes a step of determining the bandwidth in use by the first SIP session as a function of a first SIP message in the meaning of the invention. The message 34 is then relayed to the SIP agent 9 and the call is set up.

Thereafter, during a stage 40, the SIP agent 20 seeks to set up another call, while the call of the SIP agent 9 is in progress. The SIP agent 20 therefore sends an INVITE SIP message 41 containing in particular the called number, the calling number, and an SDP field specifying the proposed codecs. In the example shown, the desired call is a video phone call and the proposed codecs are G722 20 ms, G711 20 ms, or G729 20 ms, and H261 or H263. The SIP gateway 23 receiving the message 41 constitutes a step of receiving a second SIP message concerning a second SIP session, in the meaning of the invention.

Thereafter, during the step 42, the SIP gateway 23 compares the available bandwidth on the Internet virtual channel with the bandwidth needed by the two proposed codecs. In the present example, since bandwidth is being used by the call of the SIP agent 9, there remain only 94 kbit/s available. The SIP gateway 23 thus determines that the available bandwidth is insufficient for the codecs G722 20 ms, G711 20 ms, H261, and H263, and that only the codec G729 20 ms can be used. The step 42 constitutes a step of determining a bandwidth authorized for the second SIP session as a function of the bandwidth of the access connection and of the bandwidth in use by the first SIP session, in the meaning of the invention.

Thereafter, the SIP gateway 23 relays the INVITE SIP message 41 by sending an INVITE SIP message 43 to the IMS network core 16 in which the SDP field has been modified so as to retain only the G729 20 ms codec. Sending the message 43 constitutes a step of sending a third SIP message determined as a function of the bandwidth authorized for the second SIP session, in the meaning of the invention.

The stage 40 is followed by a voice call being set up that makes use only of the G729 20 ms codec. During a step that is not shown, the bandwidth management module 24 determines the bandwidth in use by the SIP agent 20, since this information might be of use subsequently.

It is observed that the method of processing SIP messages that is performed by the gateway 1 serves to filter out codecs from the message 41 so as to set up two SIP sessions that are simultaneous by using codecs that are compatible with the bandwidth available on the access connection 18. As a result, no conversation suffers from quality degradation because of bandwidth that is insufficient given the negotiated codec(s).

During a stage 50 the SIP agent 9 seeks to terminate its current call. Thus, it sends a BYE SIP message 51. In response to receiving the message 51, during a step 52, the bandwidth management module 24 determines that the bandwidth being used by the SIP agent 9 is zero from now on. During a step 53, the bandwidth management module 24 therefore determines that additional bandwidth is available for the SIP agent 20.

Thus, during a stage 60, the SIP gateway 23 sends a Re-INVITE SIP message 31 without an SDP field in order to propose that the SIP agent 20 renegotiates the codecs in use. The SIP agent 20 responds with a 200 OK SIP message 62 in which the SDP field is identical to that of the message 41. In response to receiving the message 62, the SIP gateway 23 acts in a step 63 to compare the bandwidth available on the Internet virtual channel with the bandwidth needed for the proposed codecs. In the present example, since the SIP agent 9 is no longer using any bandwidth, the gateway 23 determines that the available bandwidth makes it possible to use the codecs G722 20 ms, G711 20 ms, and G729 20 ms. The SIP gateway 23 then relays the message 62 by sending a Re-INVITE SIP message 64 to the IMS network core 16, in which message the SDP field has been modified so as to retain only the codecs G722 20 ms, G711 20 ms, and G729 20 ms. The conversation can then continue with the negotiated codec G722 20 ms, thereby providing quality that is better than that of the G729 20 ms codec that was previously in use.

In the meaning of the invention, receiving the message 51 also constitutes a step of receiving a first SIP message concerning the first SIP session, and the step 52 constitutes a step of determining the bandwidth in use by the first SIP session as a function of the first SIP message. The step 53 constitutes a step of determining a bandwidth authorized for the second SIP session as a function of the bandwidth of the access connection and of the bandwidth in use by the first SIP session, and sending the message 61 constitutes a step of sending a third SIP message determined as a function of the bandwidth authorized for the second SIP session.

It can be seen that the method of processing SIP messages that is performed by the gateway 1 also makes it possible to detect when bandwidth is released and to notify this information so as to improve the quality of an ongoing call, by renegotiating the codecs in use.

Figure 3:
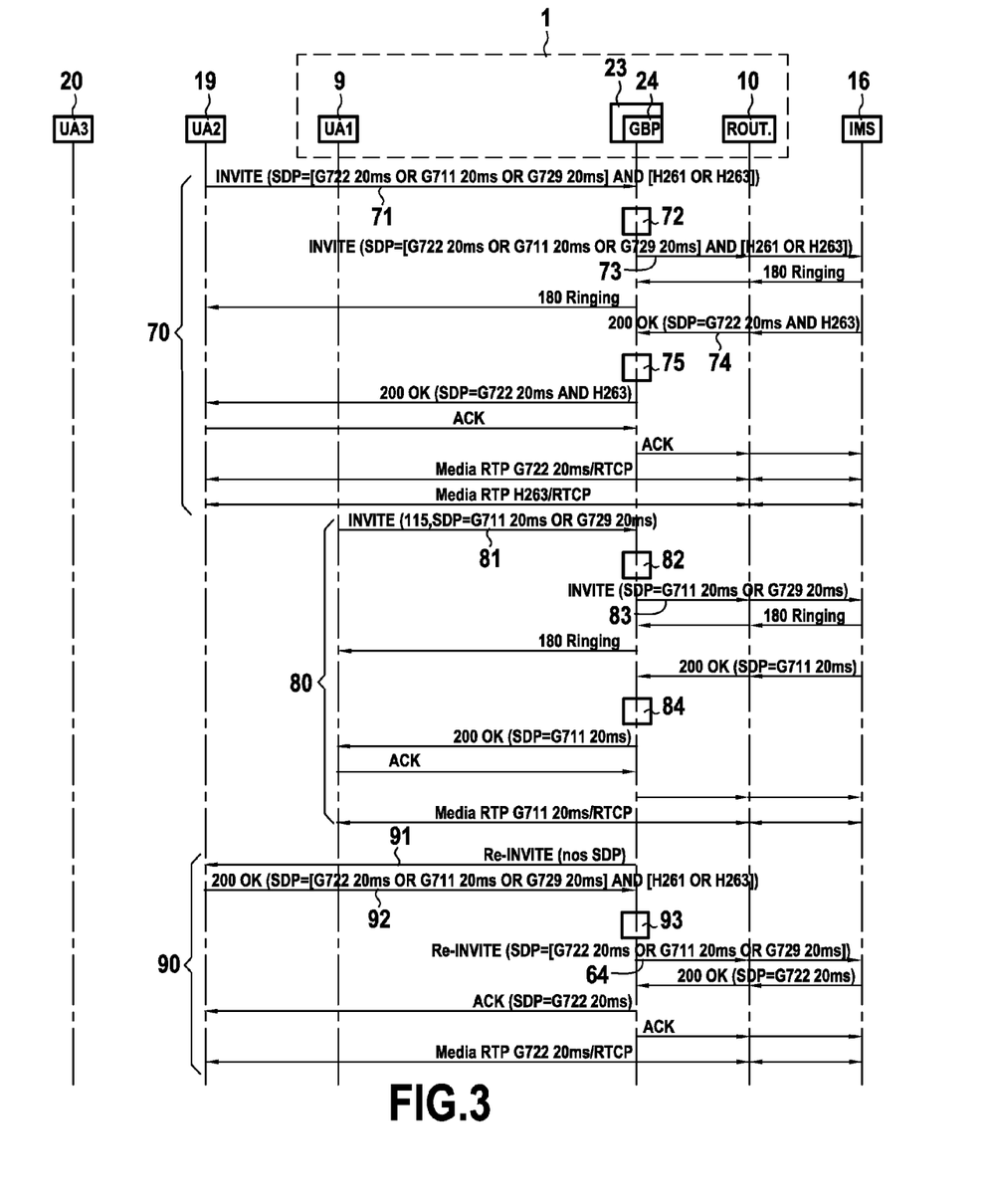

FIG. 3 shows a second example of the conduct of the SIP message processing performed by the gateway 1.

It is assumed that initially there is no call in progress. Thereafter, during a stage 70, the SIP agent 19 seeks to set up a video phone call. It therefore sends an INVITE SIP message 71 containing in particular the called number, the calling number, and an SDP field specifying the codecs that are proposed. In the example shown, the desired call is a video phone call and the proposed codecs are G722 20 ms or G711 20 ms or G729 20 ms, and H261 or H263. Thereafter, during a step 72, the SIP gateway 23 compares the bandwidth available on the Internet virtual channel with the bandwidth needed for the proposed codecs. In this example, since all of the bandwidth of the access connection 18 is available, the SIP gateway 23 determines that all of the codecs can be used. Thus, the SIP gateway 23 relays the INVITE SIP message 71 by sending an INVITE SIP message 73 to the IMS network core 16, without modifying the SDP field.

In the example shown, the response received from the IMS network core 16 is a 200 OK SIP message 74 in which the SDP field contains the negotiated codecs G722 20 ms and H263. The message 74 is received by the SIP gateway 23, this constituting a step of receiving a first SIP message concerning a first SIP session, in the meaning of the invention. As a result of receiving the message 74, the bandwidth management module 24 acts in a step 75 to determine that the SIP agent 19 is to use bandwidth corresponding to the negotiated codecs, namely 180 kbit/s out of the 200 kbit/s available in this example. The step 74 constitutes a step of determining the bandwidth in use by the first SIP session as a function of a first SIP message, in the meaning of the invention. The message 74 is then relayed to the SIP agent 19 and the call is set up.

Thereafter, during a stage 80, the SIP agent 9 seeks to set up a call while the call of the SIP agent 19 is in progress. The SIP agent 9 thus sends an INVITE SIP message 81 containing in particular the called number, the calling number, and an SIP field specifying the proposed codecs. In the example described, the desired call is an emergency call to a priority number 115 and the codecs that are proposed are G711 20 ms or G729 20 ms. The SIP gateway 23 receiving the message 81 constitutes a step of receiving a second SIP message concerning a second SIP session, in the meaning of the invention.

Thereafter, during the step 82, the SIP gateway 23 compares the bandwidth available on the conversational virtual channel with the bandwidth needed for the proposed codecs. In the present example, because of the bandwidth being used by the call of the SIP agent 19, only 20 kbit/s remain available. The SIP gateway 23 thus determines that the available bandwidth is not sufficient for the proposed codecs. However, since the call coming from the SIP agent 9 is a priority call (emergency number 115), the SIP gateway 23 considers that the SIP agent 19 must release bandwidth for the SIP agent 9, and that the bandwidth should be made available for the SIP agent 9. Step 82 consists in a step of determining a bandwidth authorized for the second SIP session as a function of the bandwidth of the access connection and as a function of the bandwidth in use by the first SIP session, in the meaning of the invention.

Thereafter, the SIP gateway 23 relays the INVITE SIP message 81 by sending an INVITE SIP message 83 to the IMS network core 16, without modifying the SDP field.

The stage 80 continues with a voice call being set up that makes use of the negotiated G711 20 ms codec. In a step 84, the bandwidth management module 24 determines the bandwidth in use by the SIP agent 9, since this information might be of use subsequently.

Furthermore, during a stage 90, the SIP gateway 23 sends a Re-INVITE SIP message 91 without an SDP field in order to propose that the SIP agent 19 renegotiates the codecs in use. Sending the message 91 constitutes a step of sending a third SIP message determined as a function of the bandwidth authorized for the second SIP session, in the meaning of the invention. The SIP agent 19 responds with a 200 OK SIP message 92 in which the SDP field is identical to that of the message 71. In response to receiving the message 92, the SIP gateway 23 acts in a step 93 to compare the bandwidth available on the Internet virtual channel with the bandwidth needed by the proposed codecs. In the present example, since the SIP agent 9 is using bandwidth, the gateway 23 determines that the bandwidth available does not allow the H261 and H263 codecs to be used. The SIP gateway 23 therefore relays the message 92 by sending a Re-INVITE SIP message 94 to the IMS network core 16 in which the SDP field has been modified so as to retain only the codecs G722 20 ms, G711 20 ms, and G729 20 ms. The conversation may then continue with the negotiated codec G722 20 ms.

It can be seen that the method of processing SIP messages as performed by the gateway 1 enables the SIP agent 19 to be forced to renegotiate the codecs in use so as to release bandwidth for a call that is considered to have priority. Thus, the method makes it possible to establish two simultaneous SIP sessions using codecs that are compatible with the bandwidth available on the access connection 18. None of the conversations present quality degradation resulting from bandwidth that is not sufficient for the negotiated codec(s).

In the arrangement of FIGS. 1 to 3, the SIP gateway 23 is situated in the gateway 1 and is in series in the SIP signaling streams, thus enabling it to filter the codecs of the SDP fields and to force renegotiation of the codecs in use by sending Re-INVITE SIP messages. It should be observed that in an alternative arrangement, the functions of filtering SDP fields and of sending Re-INVITE messages may be performed by an SIP gateway still situated in series in the SIP signaling streams but located in a node of the network 15 other than the gateway 1. For example, these functions may be performed in an application server 17, providing the application server 17 has knowledge of the access bandwidth of the access connection 18. For this purpose, and by way of example, the application server 17 may obtain this information from the gateway 1 in a SIP SUBSCRIBE message sent by the gateway 1 after its SIP registration in the IMS network core 16. In a variant, the application server 17 may obtain this information from equipment of the access network, for example from a digital subscriber line access multiplexer (DSLAM).

Thus, a device for processing SIP messages in accordance with the invention may for example be a home gateway or an application server.

It may be observed that in the above-described arrangements, the behavior of the SIP agents 9, 19, and 20 compiles with the behavior of a conventional SIP agent. They therefore do not require any particular configuration.

Figure 4:
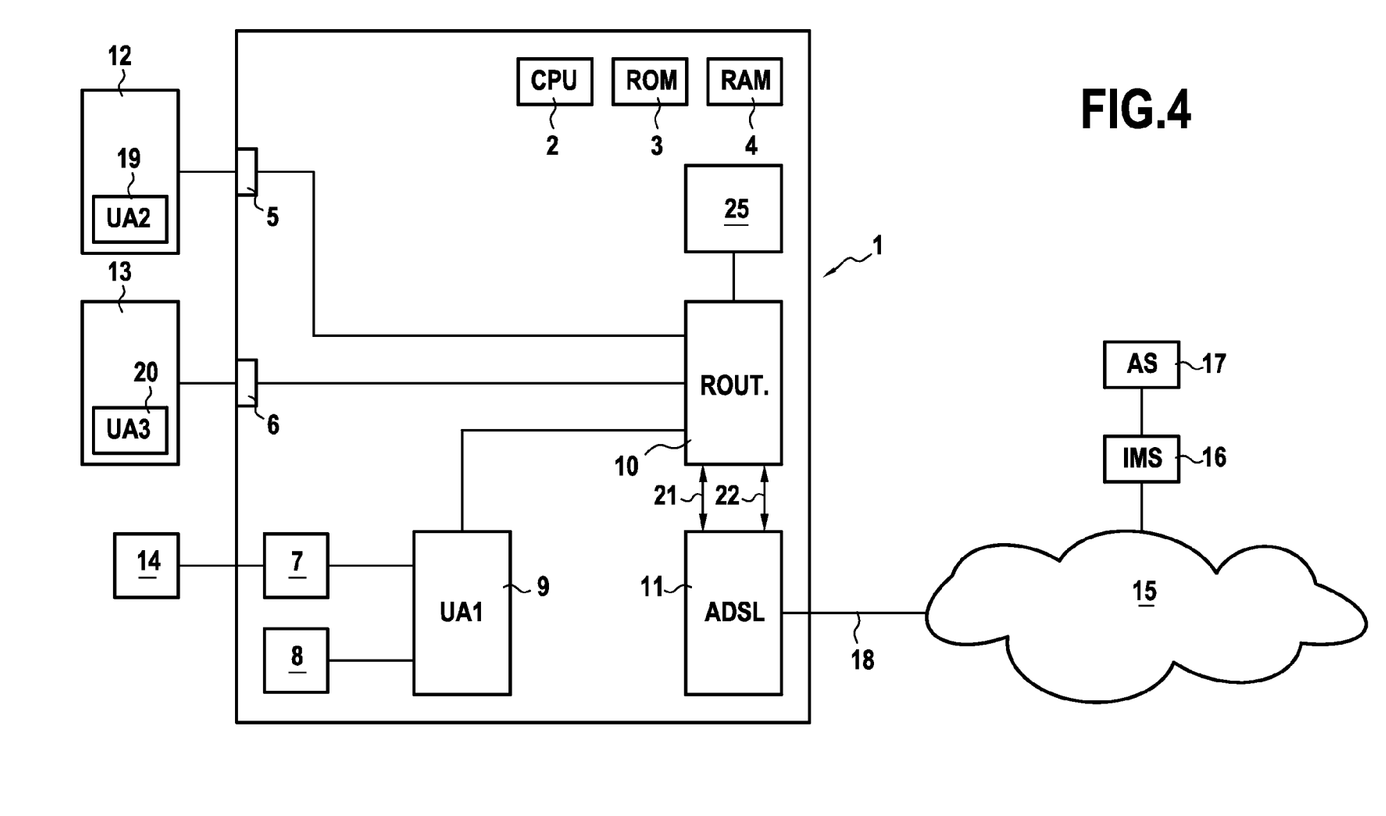
FIG. 4 is a diagram showing a home gateway, in its environment and performing an SIP message processing method in another arrangement of the invention.

FIG. 4 shows another home gateway in its environment. Elements that are identical or similar to elements of the home gateway of FIG. 1 are designated by the same references, without risk of confusion, and they are not described again in detail.

In the gateway 1 of FIG. 4, the SIP agent 9 is connected to the router module 10. The SIP agents 19 and 20 are also connected to the router module 10 via interfaces 5 and 6. The home gateway 1 includes a bandwidth management module 25 connected to the router module 10.

The role of the bandwidth management module 25 is in particular:

to detect the total bandwidth at the access (BPGA) of the access connection 18;

to detect the bandwidth per specialized interface (BPIS);

to estimate in real time the bandwidth available on the access as a whole and/or per specialized interface, e.g. on the basis of SIP signaling messages and/or on the basis of analyzing recurrent traffic transmitted/received in the lower layers; and to communicate with the SIP agents 9, 19, and 20 to inform them of the bandwidth they can use.

By way of example, the bandwidth management module 25 is implemented in the form of a state agent notifier in the meaning of IETF document RFC 3265, which implies that an Event Package, e.g. referred to as "GBA" needs to be created, which package should be suitable for being standardized by the IETF or the 3GPP.

Furthermore, in this arrangement, the SIP agents 9, 19, and 20 are configured to be able:

to recover the universal resource identifier (URI) address of the bandwidth management module 25 and to communicate therewith;

to communicate with the bandwidth management module 25 in order to inform it about the bandwidth being used and in order to obtain information about the bandwidth that can be used; and to take account of the messages received from the bandwidth management module 25.

Figure 5:
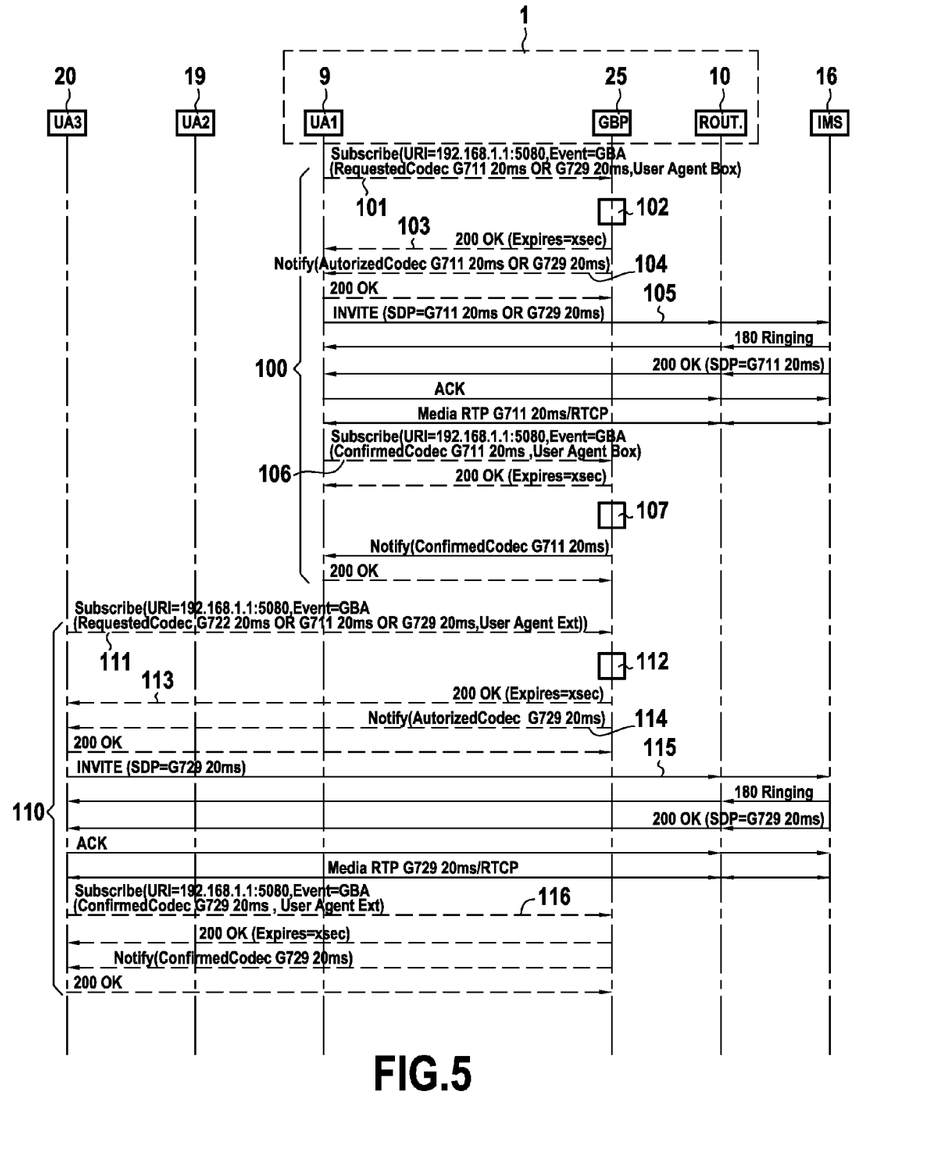
FIGS. 5 to 8 show messages exchanged while executing the SIP message processing method performed by the FIG. 4 gateway.
Figure 6:
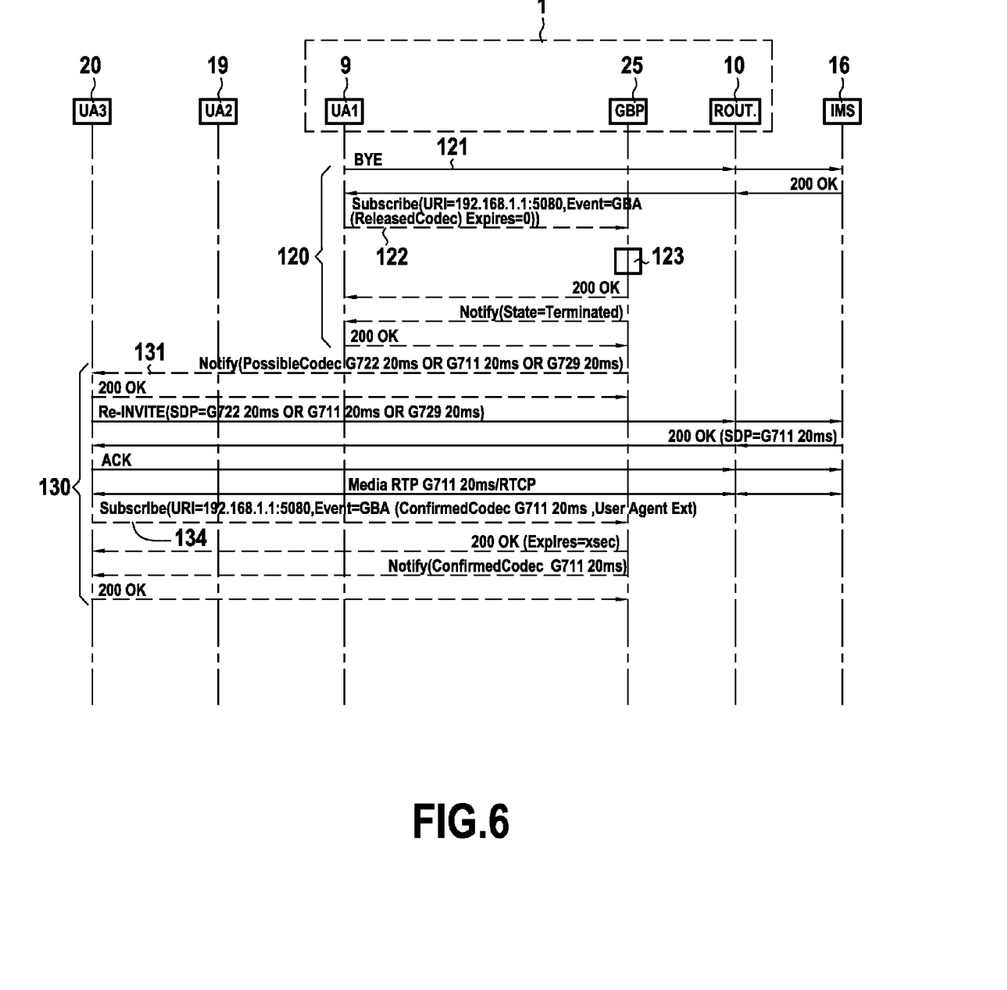

With reference to FIGS. 5 and 6, there follows a description of a first example of the conduct of SIP message processing performed by the gateway 1 of FIG. 4.

When the gateway 1 starts (and on each synchronization in the event of an xDSL access), the bandwidth management module 25 detects the total bandwidth at the access (BPGA) of the access connection 18 and also the bandwidth of each specialized interface. For example, the access overall bandwidth is 200 kbit/s and the conversational virtual channel bandwidth is 160 kbit/s.

In conventional manner, each SIP agent 9, 19, and 20 is registered in the IMS network core 16. Furthermore, the SIP agents 9, 19, and 20 obtain the URI address for communicating with the bandwidth management module 25. For example, the URI address is supplied in a configuration file (e.g.: 192.168.1.1:5080), or in an option of a DHCP server of the gateway 1 that serves to provide the terminals 12 and 13 with IP addresses, or it may be obtained by a self-discovery message broadcast over the local network of the gateway 1.

In FIG. 5, during a stage 100, the SIP agent 9 seeks to set up a voice call. Before sending the INVITE SIP message 105, the SIP agent 9 subscribes with the bandwidth management module 25 by means of a Subscribe SIP message 101. The message 101 contains in particular a "RequestedCodec" field specific to the Event Package GBA containing the codecs that the SIP agent 9 seeks to use, and a field specifying that the message 101 comes from an SIP agent internal to the gateway 1. In the example shown, the desired call is a voice call and the codecs that are proposed are G711 20 ms or G729 20 ms. Thus, during a step 102, the bandwidth management module 25 stores the codecs compatible with the SIP agent 9 and compares the available bandwidth with the bandwidth needed by the proposed codecs. In the present example, since no other conversation is ongoing, both of the proposed codecs are compatible with the available bandwidth. Thus, the bandwidth management module 25 confirms the subscription with a 200 OK SIP message 103 and sends a Notify SIP message 104 containing a field specifying the authorized codecs, which in this example are identical to the codecs requested in the message 101.

The SIP agent 9 can then send an INVITE SIP message 105 containing an SDP field with the authorized codecs, and it can set up the conversation using the negotiated codec, which is G711 20 ms in the example described. Once the conversation has been set up, the SIP agent 9 sends a subscribe SIP message 106 to the bandwidth management module 25, the message 106 containing in particular a "ConfirmedCodec" field specific to the Event Package GBA and specifying the negotiated codec. Thus, in a step 107, the bandwidth management module 25 may deduce from the negotiated codec the bandwidth that is to be used by the SIP agent 9 and can thus determine the bandwidth that remains available.

Thereafter, in a stage 110, the SIP agent 20 seeks to set up a voice call. Before sending the INVITE SIP message 115, the SIP agent 20 subscribes with the bandwidth management module 25 by means of a Subscribe SIP message 111. The message 111 contains in particular a "RequestedCodec" field specific to the Event Package GBA and containing the codecs that the SIP agent 20 seeks to use, and a field specifying that the message 101 comes from an SIP agent external to the gateway 1. In the example described, the desired call is a voice call and the proposed codecs are G722 20 ms or G711 20 ms or G729 20 ms. Thus, in a step 112, the bandwidth management module 25 stores the codecs that are compatible with the SIP agent 20 and compares the available bandwidth with the bandwidths needed by the proposed codecs. In the present example, since bandwidth is already in use by the SIP agent 9, only the G729 20 ms codec is compatible with the available bandwidth. Thus, the bandwidth management module 25 confirms the subscription with a 200 OK SIP message 113 and sends a Notify SIP message 114 containing a field specifying the authorized codecs, this field containing only the G729 20 ms codec in this example.

The SIP agent 20 can then send an INVITE SIP message 115 containing an SDP field with the authorized codec and can set up the conversation. Once the conversation has been set up, the SIP agent 20 sends a Subscribe SIP message 116 to the bandwidth management module 25, the message 116 containing in particular the "ConfirmedCodec" field specific to the Event Package GBA and specifying the negotiated codec. Thus, from the codec specified in the message 116, the bandwidth management module 25 can deduce the bandwidth that is to be used by the SIP agent 20, and can thus determine the bandwidth that remains available.

In FIG. 5, the reception of the message 106 constitutes a step of receiving a first SIP message, and the step 107 constitutes a step of determining the bandwidth in use by the first SIP session, in the meaning of the invention. Reception of the message 111 constitutes a step of receiving a second SIP message, and the step 112 constitutes a step of determining the bandwidth authorized for the second SIP session, in the meaning of the invention. Finally, sending the message 114 constitutes a step of sending a third SIP message that is determined as a function of the bandwidth authorized for the second SIP session.

It can be seen that the method of processing SIP messages performed by the gateway 1 of FIG. 4 makes it possible to select from among the codecs of the message 111, the codec that is compatible with the available bandwidth. This makes it possible to set up two simultaneous SIP sessions using codecs that are compatible with the bandwidth available on the access connection 18. Thus, no conversation presents quality that is degraded as a result of having insufficient bandwidth for the negotiated codec(s).

With reference to FIG. 6, it is now assumed that while the call of the SIP agent 20 is ongoing, the SIP agent 9 decides to release its call. During a stage 120, the SIP agent 9 sends a BYE SIP message 121 to the IMS network core 16. Furthermore, the SIP agent 9 informs the bandwidth management module 25 that the call has been released by sending it a Subscribe SIP message 122 containing a "ReleasedCodec" field. In response to receiving the message 122, the bandwidth management module 25 acts during a step 123 to determine that the bandwidth in use by the SIP agent 9 is now zero and that therefore additional bandwidth is available for the SIP agent 20.

Thus, during a stage 130, the bandwidth management module 25 sends a Notify SIP message 131 containing a "PossibleCodec" field containing the codecs handled by the SIP agent 20 (stored in step 112) that are compatible with the available bandwidth as determined in step 123. In response to receiving the message 131, the SIP agent 20 sends a Re-INVITE SIP message 132 containing an SDP field specifying the proposed codecs. In the example described, the codec negotiated as a result of the SIP session is G711 20 ms. Thus, the conversation can continue with the negotiated G711 20 ms codec, which provides better quality than the previously-used G729 20 ms codec.

In FIG. 6, reception of the message 122 constitutes a step of receiving a first SIP message and the step 123 constitutes a step of determining the bandwidth in use by the first SIP session and a step of determining the bandwidth authorized for the second SIP session, in the meaning of the invention. Sending the message 131 constitutes a step of sending a third SIP message that is determined as a function of the bandwidth authorized for the second SIP session.

It can be seen that the SIP message processing method performed by the gateway 1 of FIG. 4 also serves to propose to the SIP agent 20 that the codecs in use be renegotiated so as to make use of the additional available bandwidth and so as to improve the quality of an ongoing conversation.

Figure 7:
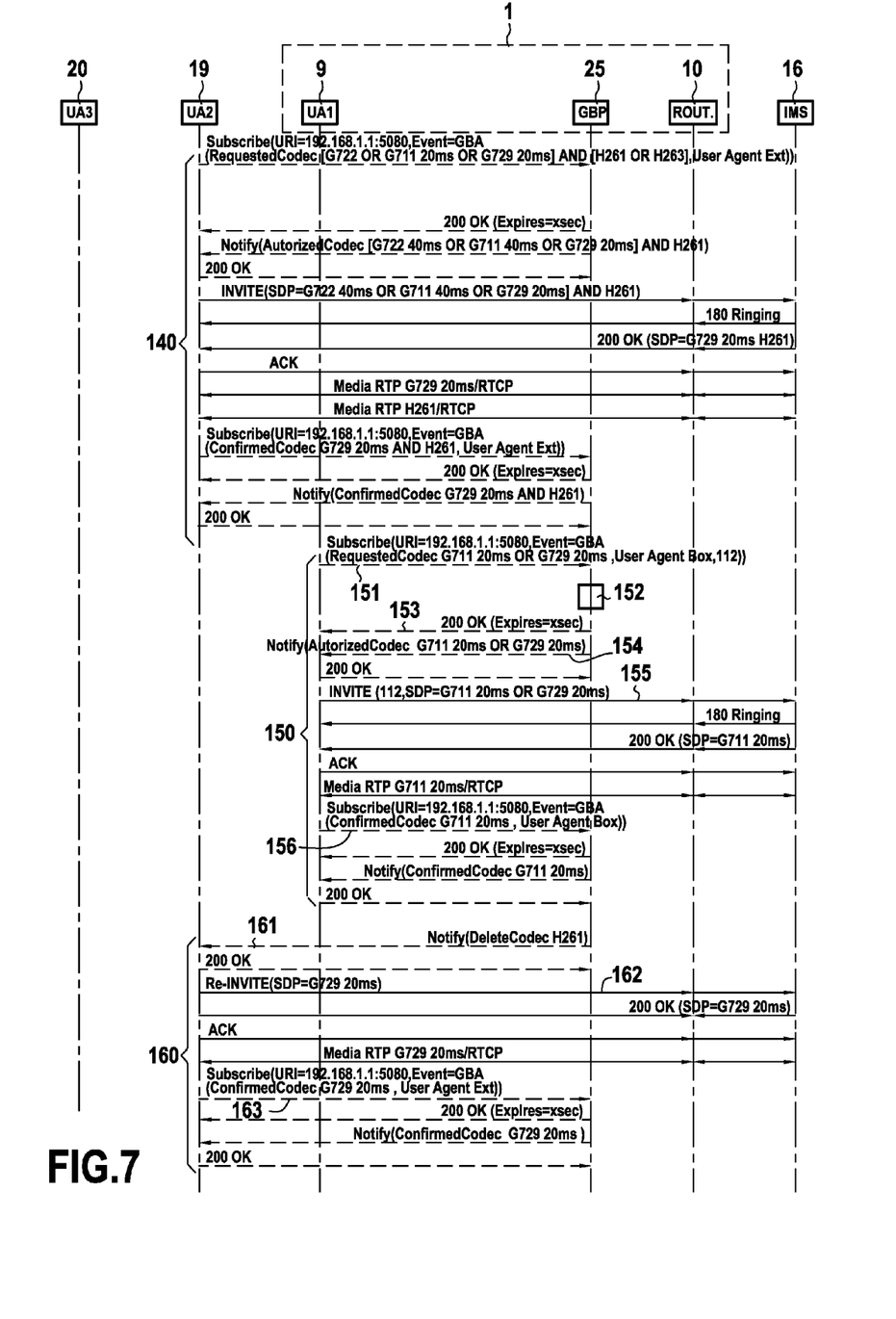

With reference to FIG. 7, there follows a description of a second example of the conduct of the SIP message processing performed by the gateway 1 of FIG. 4.

During a stage 140, the SIP agent 19 sets up a video phone call. The stage 140 is similar to the above-described stage 100 and is therefore not described in detail. At the end of the stage 140, the bandwidth management module 25 has knowledge of the bandwidth in use by the SIP agent 19 and of the codecs handled.

Thereafter, during a stage 150, the SIP agent 9 seeks to set up a voice call to an emergency number (112 in the example shown). Before sending the INVITE SIP message 155, the SIP agent 9 subscribes with the bandwidth management module 25 using a Subscribe SIP message 151 that contains in particular a "RequestedCodec" field specifying the codecs that the SIP agent 9 seeks to use. In the example shown, the desired call is a voice call and the proposed codecs are G711 20 ms or G729 20 ms. Thus, during step 152, the bandwidth management module 25 stores the codecs that are compatible with the SIP agent 9 and compares the available bandwidth with the bandwidth needed by the proposed codecs. In this example, since bandwidth is already being used by the SIP agent 19, none of the codecs are compatible with the available bandwidth. Nevertheless, since the SIP agent 9 is considered as having priority (making a call to an emergency number), the bandwidth management module 25 considers that the SIP agent 19 must release bandwidth and that the bandwidth should be made available for the SIP agent 9. Thus, the bandwidth management module 25 confirms the subscription by a 200 OK SIP message 153 and sends a Notify SIP message 154 containing a field specifying the authorized codecs, which in this case are identical to the codecs requested in the message 151.

The SIP agent 9 can then send an INVITE SIP message 155 containing an SDP field with the authorized codecs and can set up the conversation. When the conversation is set up, the SIP agent 9 sends a Subscribe SIP message 156 to the bandwidth management module 25, the message 156 containing in particular a "ConfirmedCodec" field specifying which codec has been negotiated. Thus, the bandwidth management module 25 can deduce the bandwidth that is going to be used by the SIP agent 9.

Furthermore, during a stage 160, the bandwidth management module 25 requests the SIP agent 19 to release bandwidth for the SIP agent 9. For this purpose, the bandwidth management module 25 sends a Notify SIP message 161 containing a "DeleteCodec" field and specifying the codec(s) that the SIP agent 19 can no longer use. In response to receiving the message 161, the SIP agent 19 sends a Re-INVITE SIP message 162 to renegotiate the SIP session and thus release bandwidth, and then informs the bandwidth management module of the codec used by means of a Subscribe SIP message 163.

FIG. 7 shows an example in which the bandwidth is released for a call that is considered to have priority because the destination number is an emergency number. A call may also be considered to have priority because it comes from the internal SIP message 9. The bandwidth management module 25 can determine that a Subscribe SIP message comes from an SIP agent that is internal or external by means of the above-mentioned corresponding fields (values "User agent Ext" or "User Agent Box" in FIGS. 5 to 7).

In the examples of FIGS. 5 to 7, the SIP agents 9, 19, and 20 subscribe with the bandwidth management module 25 when they desire to make a call, prior to sending an INVITE SIP message. In the variant shown in FIG. 8, the SIP agent subscribes with the bandwidth management module 25 on starting, after registration in the IMS network core 16. This achieves a saving in time since under such circumstances the context of the Subscribe SIP dialog has already been created in the SIP agents and in the bandwidth management module 25. Furthermore, this also enables the SIP agents, as a result of receiving a Notify SIP message, to know which codecs are authorized and to adapt their man/machine interfaces (MMIs) correspondingly. For example, when the available bandwidth is sufficient for a voice call but not for a video phone call, a video trigger button may be grayed out.

Figure 8:
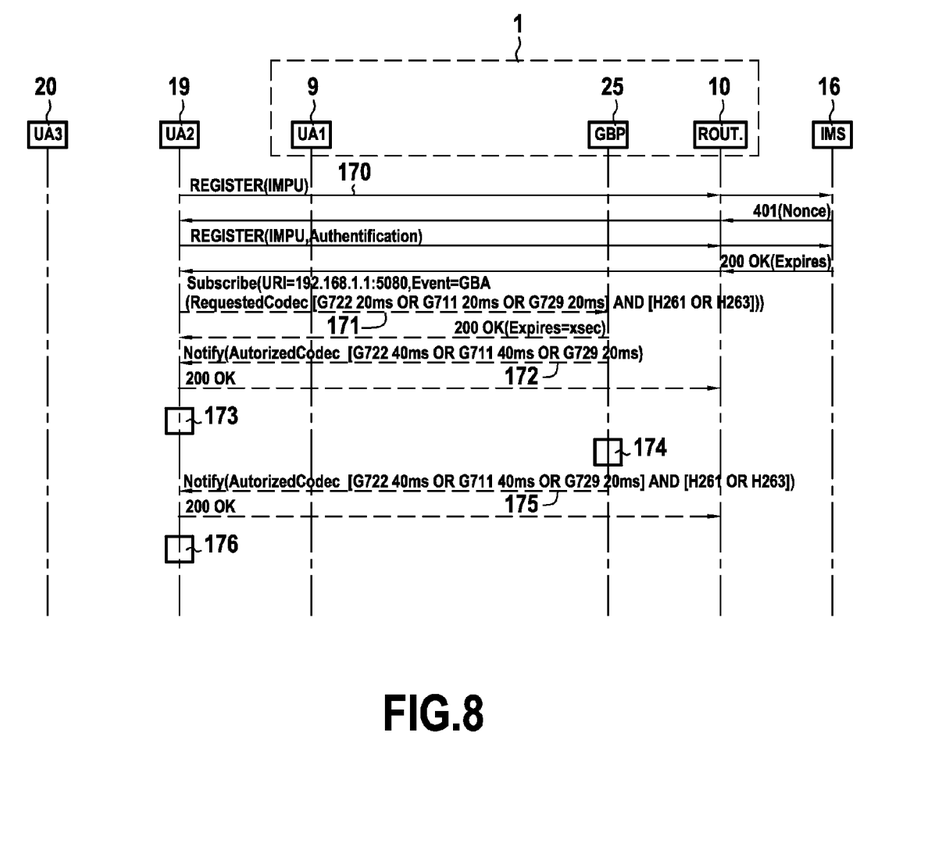

In the example of FIG. 8, the SIP agent 19 is started in step 170, and then after being registered in the IMS network core 16, it sends a Subscribe SIP message 171 to the bandwidth management module 25 even if it does not have a call to set up at that instant. The bandwidth management module 25 responds with a Notify SIP message 172 specifying the codecs that are authorized given the available bandwidth (the SIP agents 20 and 9 might be in the process of making calls). In the example shown, the bandwidth is insufficient for a video phone call and during the step 173, the SIP agent 19 adapts the MMI of the terminal 12 by graying out a button for triggering video. If during a step 174 bandwidth is released by the SIP agents 9 or 20, thereby making the use of video possible, then the bandwidth management module 25 sends a message 175 to the SIP agent 19 to inform it, and the SIP agent 19 adapts the MMI of the terminal 12 by ceasing to gray-out the video trigger button.

Adapting the MMI may also be performed in a variant of the first implementation described with reference to FIGS. 1 to 3. In this variant, the SIP agents may subscribe with the bandwidth management module 24 in order to be informed of the codecs that are authorized, in a manner similar to that described with reference to FIG. 8.

The invention is described with reference to an access connection using ADSL technology. Naturally, the invention is applicable to other types of access connection, e.g. an optical fiber connection or a cable connection or a wireless connection of the 3G, 3G+, LTE, . . . mobile type.

The invention is described with reference to a home gateway containing a single internal SIP agent 9. In a variant, the invention may be applied to a home gateway having two internal SIP agents, e.g. using the technique described in document FR 2 909 820 mentioned in the introduction.

In the implementation of the invention described above and shown in the accompanying drawings, the processing method in accordance with the invention is applied to outgoing calls, i.e. to calls issued by an SIP terminal connected locally to a home gateway and going to the IMS network core. Nevertheless, a method of the invention is naturally applicable to incoming calls, i.e. calls coming from the IMS network core for an SIP terminal locally connected to a home gateway.

The invention claimed is:

1. An SIP message processing method performed by a node of a telecommunications network, said network having a home gateway connected to an IMS network core via an access connection, at least a first SIP terminal and a second SIP terminal locally connected to said home gateway, said first SIP terminal being suitable for setting up a first SIP session to the IMS network core by passing via said access connection, said second SIP terminal being suitable for setting up a second SIP session to the IMS network core by passing via said access connection, said processing method including obtaining a bandwidth of said access connection, said processing method comprising:
    receiving a first SIP message concerning the first SIP session;
    determining the bandwidth in use by said first SIP session as a function of said first SIP message;
    receiving a second SIP message concerning the second SIP session;
    determining a bandwidth authorized for said second SIP session as a function of the second SIP message, of the bandwidth of the access connection, and of the bandwidth in use by the first SIP session; and
    sending a third SIP message to said first terminal, said second terminal, or said IMS network core, said third message being determined as a function at least of said bandwidth authorized for said second SIP session, said third SIP message being for influencing a selection of bandwidth for the first SIP session or for the second SIP session.

2. A processing method according to claim 1, wherein said second SIP message is an INVITE SIP message sent by the second SIP terminal and containing an SDP field specifying the codecs desired by the second SIP terminal, said determination of a bandwidth authorized for said second SIP session comprising selecting at least one authorized codec from said desired codecs, and said third SIP message being an INVITE SIP message sent to the IMS network core and containing an SDP field specifying said at least one authorized codec.

3. A processing method according to claim 2, wherein said first SIP message is an OK SIP message containing an SDP field specifying the codec(s) in use for the first SIP session, the bandwidth in use by the first SIP session being determined as a function of said codec(s) in use.

4. A processing method according to claim 1, wherein, in response to determining that the bandwidth in use by the first SIP session is less than the bandwidth previously used by the first SIP session, the third SIP message is a Re-INVITE SIP message sent to the second SIP terminal and not containing an SDP field.

5. A processing method according to claim 4, wherein said first SIP message is a BYE SIP message received from the first SIP terminal.

6. A processing method according to claim 1, wherein, when the second SIP message contains information specifying that the second SIP session has higher priority than the first SIP session, the third SIP message is a Re-INVITE SIP message sent to the first SIP terminal and not containing an SDP field.

7. A processing method according to claim 1, wherein said second SIP message is a Subscribe SIP message sent by the second SIP terminal and containing an SDP field specifying the codecs desired by the second SIP terminal, said determination of a bandwidth authorized for said second SIP session including the selection of at least one authorized codec from among said desired codecs, and said third SIP message being a Notify SIP message sent to said second SIP terminal and containing an SDP field specifying said at least one authorized codec.

8. A processing method according to claim 7, wherein said first SIP message is a Subscribe SIP message containing an SDP field specifying the codec(s) in use for the first SIP session, the bandwidth in use by the first SIP session being determined as a function of said codec(s) in use.

9. A processing method according to claim 1, wherein, in response to determining that a bandwidth in use by the first SIP session is less than a bandwidth previously used by the first SIP session, the third SIP message is a Notify SIP message sent to the second SIP terminal and containing a field specifying the codecs authorized for the second SIP session.

10. A processing method according to claim 9, wherein said first SIP message is a Subscribe SIP message containing a field indicating that at least one codec previously used by the first SIP session is no longer in use.

11. A processing method according to claim 1, wherein, when the second SIP message contains information specifying that the second SIP session has higher priority than the first SIP session, the third SIP message is a Notify SIP message sent to the first SIP terminal and containing a field specifying at least one codec that is no longer authorized for the first SIP session.

12. A processing method according to claim 1, including sending a Notify SIP message containing at least one authorized codec to said first or second SIP terminal, said first or second SIP terminal being suitable for adapting a man/machine interface as a function of said at least one authorized codec.

13. A non-transitory computer readable information medium having stored thereon instructions for performing the processing method of claim 1, when said instructions are executed by a computer.

14. An SIP message processor device for a telecommunications network including a home gateway connected to an IMS network core by an access connection, at least a first SIP terminal and a second SIP terminal locally connected to said home gateway, said first SIP terminal being suitable for setting up an SIP session to the IMS network core by passing via said access connection, said second SIP terminal being suitable for setting up a second SIP session to the IMS network core by passing via said access connection, said processor device including means for obtaining a bandwidth of said access connection, and said processor device comprising:
    means for receiving a first SIP message concerning the first SIP session;

means for determining the bandwidth in use by said first SIP session as a function of said first SIP message;

means for receiving a second SIP message concerning the second SIP session;

means for determining a bandwidth authorized for said second SIP session as a function of the bandwidth of the access connection and of the bandwidth in use by the first SIP session; and means for sending a third SIP message to said first terminal, said second terminal, or said IMS network core, said third message being determined as a function at least of said bandwidth authorized for said second SIP session, said third SIP message being for influencing a selection of bandwidth for the first SIP message or for the second SIP session.

15. A home gateway including a processor device according to claim 14.

16. An SIP message processor device for a telecommunications network including a home gateway connected to an IMS network core by an access connection, at least a first SIP terminal and a second SIP terminal locally connected to said home gateway, said first SIP terminal being suitable for setting up an SIP session to the IMS network core by passing via said access connection, said second SIP terminal being suitable for setting up a second SIP session to the IMS network core by passing via said access connection, said processor device including means for obtaining a bandwidth of said access connection, and said processor device comprising:

a component configured to receive a first SIP message concerning the first SIP session;

a component configured to determine the bandwidth in use by said first SIP session as a function of said first SIP message;

a component configured to receive a second SIP message concerning the second SIP session;

a component configured to determine a bandwidth authorized for said second SIP session as a function of the bandwidth of the access connection and of the bandwidth in use by the first SIP session; and a component configured to send a third SIP message to said first terminal, said second terminal, or said IMS network core, said third message being determined as a function at least of said bandwidth authorized for said second SIP session, said third SIP message being for influencing a selection of bandwidth for the first SIP message or for the second SIP session.

17. A home gateway including a processor device according to claim 16.

* * * * *